United States Patent [19]

Piazzola

[11] Patent Number: 4,565,921

[45] Date of Patent: Jan. 21, 1986

[54] ELECTRIC THERMAL UNIT FOR CONTROLLABLY HEATING CYLINDERS HAVING TWO COAXIAL INTERSPACES FOR CIRCULATING VENTILATION AIR THERETHROUGH

[76] Inventor: Gaetano Piazzola, Via Borri, 148 21100- Varese, Italy

[21] Appl. No.: 588,670

[22] Filed: Mar. 12, 1984

[30] Foreign Application Priority Data

Mar. 17, 1983 [IT] Italy ............................. 20131 A/83

[51] Int. Cl.$^4$ ............................................. H05B 3/02
[52] U.S. Cl. ............................... 219/550; 219/530; 219/535; 219/532; 219/552; 425/547
[58] Field of Search ............... 219/530, 532, 535, 536, 219/537, 539, 540, 549, 550, 552, 388, 390, 469, 470, 471; 338/213, 317; 174/DIG. 8, 137 R, 138 J; 428/36; 425/381.2, 542, 547

[56] References Cited

U.S. PATENT DOCUMENTS

| 988,695 | 4/1911 | Cook | 219/550 X |
| 1,855,092 | 4/1932 | Browne | 219/550 X |
| 2,549,944 | 4/1951 | Steiner | 219/550 |
| 2,722,597 | 11/1955 | Steiner | 219/550 X |
| 3,036,187 | 5/1962 | Goldstaub et al. | 219/550 X |
| 3,887,790 | 6/1975 | Ferguson | 219/535 |
| 4,504,734 | 3/1985 | Piazzola | 219/550 |

FOREIGN PATENT DOCUMENTS

| 516395 | 1/1931 | Fed. Rep. of Germany | 219/550 |
| 654115 | 3/1936 | Fed. Rep. of Germany | 219/550 |
| 1194970 | 11/1959 | France | 219/550 |

*Primary Examiner*—Volodymyr Y. Mayewsky
*Attorney, Agent, or Firm*—Bucknam and Archer

[57] ABSTRACT

An electric thermal unit is disclosed for controllably heating cylinders in plastic material extruders, rubber drawing machines, and the like apparata. The electric thermal unit is designed to provide closed circuit ventilation air circulation such as to enable the heated outlet air to be used for other applications, whether related or not to the proper operation of the cited apparata.

5 Claims, 6 Drawing Figures

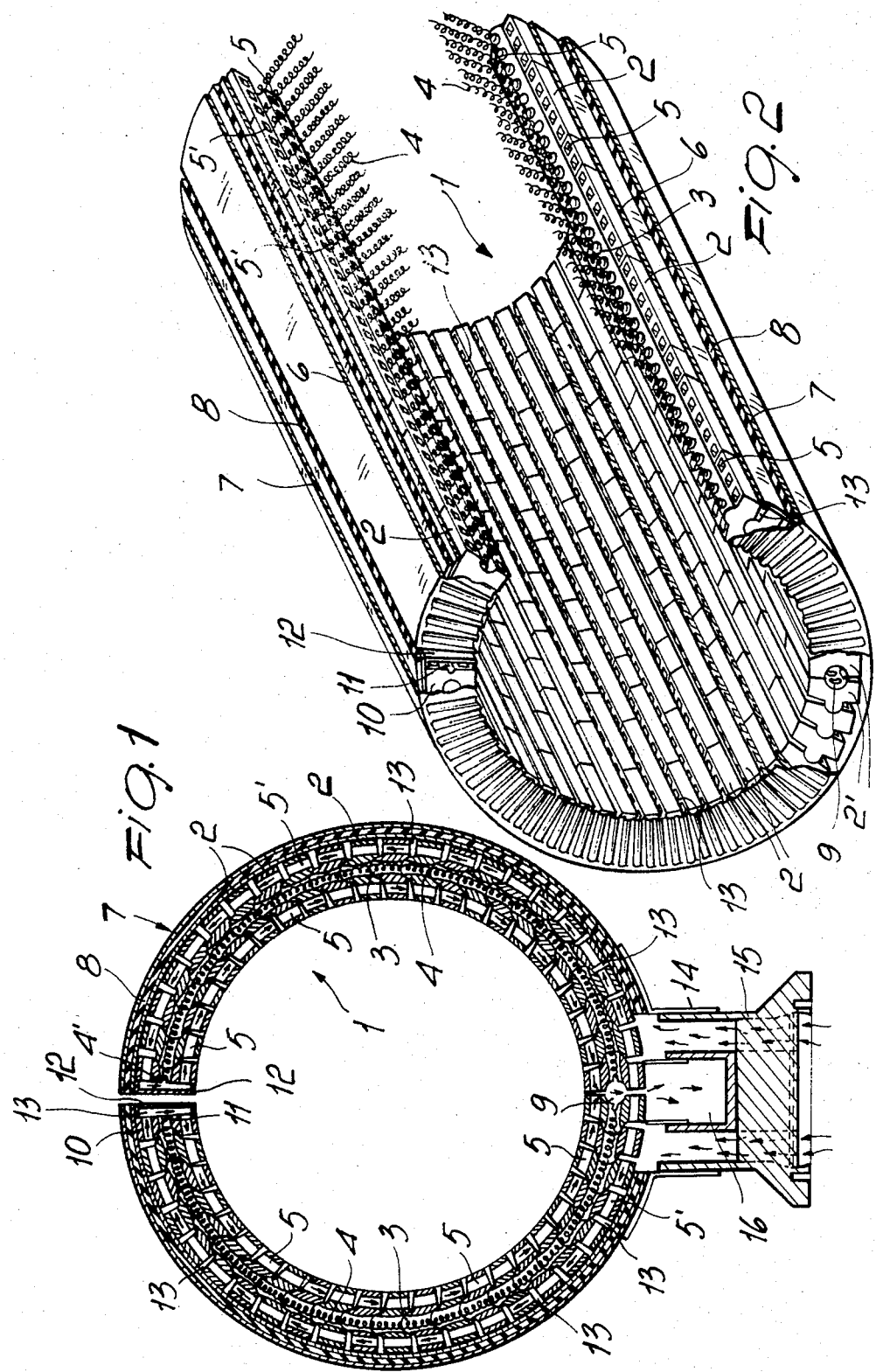

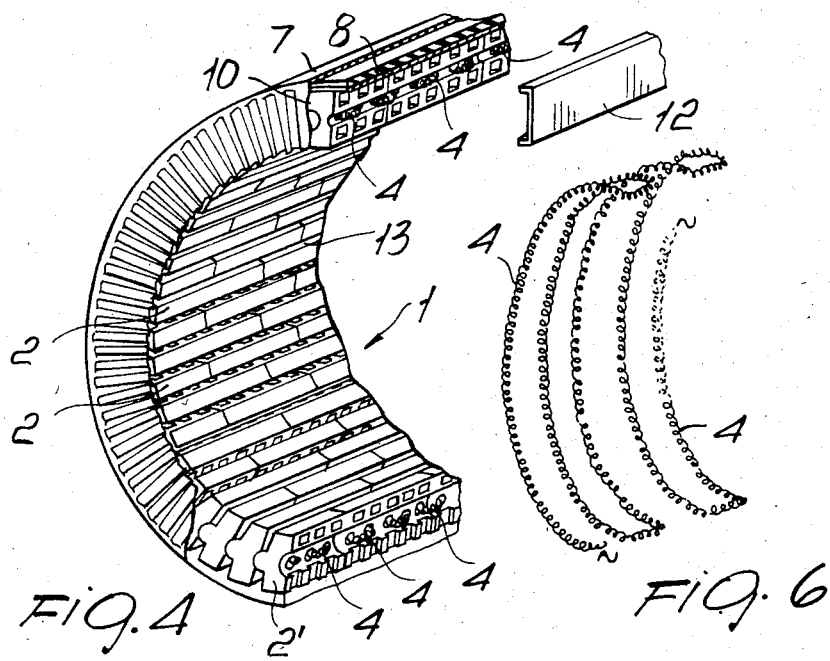
Fig. 4
Fig. 6
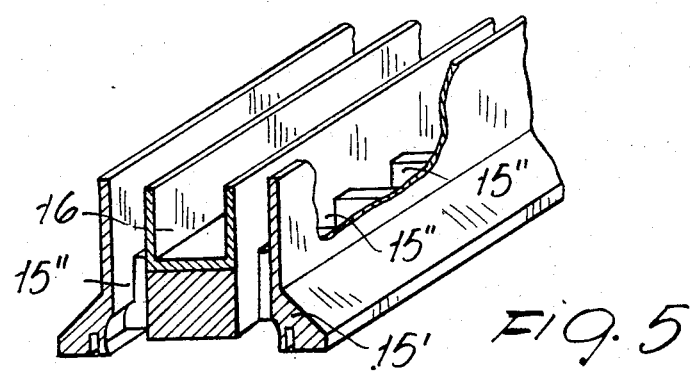
Fig. 5
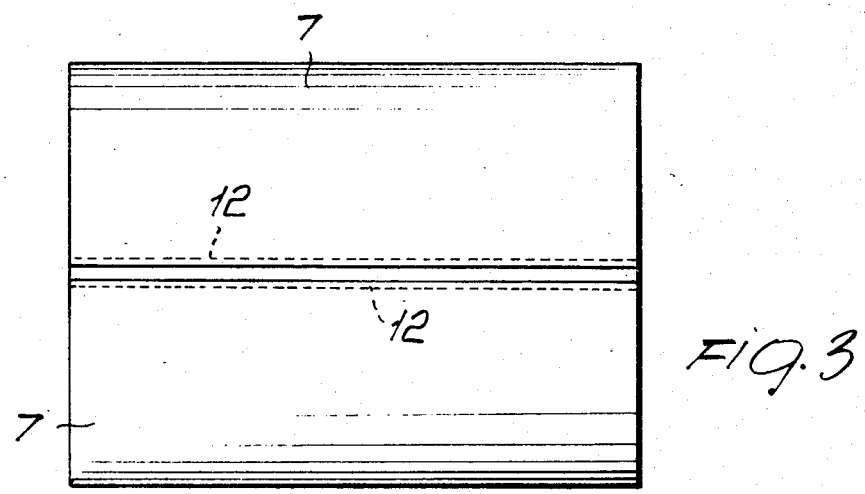
Fig. 3

ELECTRIC THERMAL UNIT FOR CONTROLLABLY HEATING CYLINDERS HAVING TWO COAXIAL INTERSPACES FOR CIRCULATING VENTILATION AIR THERETHROUGH

BACKGROUND OF THE INVENTION

This invention relates to an electric thermal unit for controllably heating cylinders in extruders and injection presses for plastic materials, rubber drawing machines, and the like apparata, having two coaxial interspaces for circulating ventilating air therethrough.

As is known, some processing operations of plastomeric and elastomeric materials in general require the availability of specific equipment (such as extruders, injection presses, and drawing machines) comprising essentially a screw arranged to turn with a little play within a coaxial cylinder.

Also known is that said cylinder must be provided with a heating means, controlled by some suitable automatic heat regulating systems, effective to promote proper sonftening of the material prior to its being forced through a forming die (or die plate).

Such heating means usually comprises spiral coil resistance heaters which, being laid between suitably shaped ceramic supports, encircle the cylinder.

More precisely, such electric resistance heaters and related insulating supports are held in a ring-like structure which comprises two or more hingedly interconnected parts and is adapted to fit closely against the outer surface of said cylinder.

It should be noted, however, that said ring-like structure enclosing the resistance heater is, in turn, subjected to undesired surface heating and may, accordingly, become a potential risk for the machine operators.

Further, in view of heat tending to flow upwards, the cylinder temperature is at all times slightly above that of the cylinder lower portion.

This circumstance may originate disuniformity in the mixture and result in finished products which fall short of expectations.

It should be further remembered that, sometimes, conventional electric thermal units incorporate ventilation systems effective to promote containment of the cylinder temperature within more suitable ranges for the intended processing operations.

Such prior ventilation systems usually include a jacket surrounding the electric thermal unit, wherethrough air is circulated to just provide local cooling which may, therefore, enhance any temperature differential existing between the cylinder upper and lower portions.

SUMMARY OF THE INVENTION

It is a primary object of this invention to remove such prior shortcomings by providing an electric thermal unit for controllably heating cylinders in extruders and drawing machines, which is configured to constantly have the outer wall of its case at a low temperature.

It is another object of the invention to provide an electric heater unit for controllably heating cylinders in extruders and drawing machines, which can promote even distribution of the temperature within the cylinders.

A further object of this invention is to provide an electric thermal unit for controllably heating cylinders in extruders and drawing machines, which affords the possibility of recovering and utilizing spent ventilation air.

These and other objects, such as will be apparent hereinafter, are achieved by an electric thermal unit for controllably heating cylinders in extruders and drawing machines, according to the invention, characterized in that it comprises a resistance heater incorporated to a structure bent on itself into a ring-like shape and including a plurality of ceramic strips of a suitable shape which are coupled together and define, at the middle longitudinal portion thereof, holes for passing as many runs of said resistance heater therethrough, and at peripheral longitudinal portions thereof, holes or grooves forming two sets of coaxial ring-like interspaces, said interspaces being interconnected at the two ends, laid side-by-side, of said structure, said structure being secured to a double outer band; the outer one in said two sets of peripheral interspaces being in communication with a cool air supply apparatus, and the inner one in said two sets of peripheral interspaces being in communication with a header adapted to deliver heated exhaust air to subsequent utilization outlets.

BRIEF DESCRIPTION OF THE DRAWINGS

Further features and advantages of the electric thermal unit for controllably heating cylinders in extruders and drawing machines, according to the invention, will be more clearly understood from the following detailed description of a preferred embodiment thereof, with reference to the accompanying illustrative drawing, where:

FIG. 1 is a cross-sectional view through this electric thermal unit; and

FIG. 2 is a perspective view of this electric thermal unit from which has been omitted the cold air supply duct-hot air collecting header assembly;

FIG. 3 is a top view of FIG. 1;

FIG. 4 is a broken away partially sectioned perspective view of the electric thermal unit;

FIG. 5 is a detail view of the cold air supply duct-hot air header assembly to be associated with the subject electrical thermal unit; and FIG. 6 is a wiring diagram of the heating resistance

DESCRIPTION OF A PREFERRED EMBODIMENT

Referring in particular to the reference numerals used in the views of the accompanying drawing, this electric thermal unit for controllably heating cylinders in extruders and drawing machines comprises a ring-like structure 1 formed of a plurality of shaped strips 2 of substantially parallelepipedal configuration and rectangular cross-section, which are secured to one another by coupling together the major faces thereof, such mating faces having a longitudinal middle portion thereof which follows a respectively concave and convex pattern.

Formed across said longitudinal middle portions of the strips are throughgoing holes 3 which define, in combination with corresponding holes in adjoining strips, as many housings for accommodating a spiral coil resistance heater 4 therein consisting of a plurality of half-coils series coupled as it is shown in FIG. 6

Formed through two peripheral longitudinal portions of the strips 2 are further crosswise extending inner through holes 5 and outer through holes 5', which also form, together with the corresponding holes through the adjoining strips, two continuous axially extending ring-like air circulating interspaces, that is an inner hot air circulating interspace 5 and an outer coil air circulating interspace 5' (see FIG. 1).

Such strips are held together by two externally applied bands or straps made for example of a metal material 6 and 7, which inclose a layer of a suitably insulating material 8 and have their ends joined together by means of suitable fasteners (not shown) and which may consist of closure hook members applied at the top of the outer surface of the outer band 7 at spaced intervals thereon.

More specifically, the structure 1 extends from two juxtaposed strips 2', which bound a longitudinal hole 9, and is terminated on both sides with a differentiated strip 10 having a middle groove 11 for accommodating the bent portion 4' of adjoining runs of the resistance heater 4 which extends through the holes 3.

A strip 12 cooperates with said differentiated strip to form in essence a further interspace 13 effective to communicate the cited interspaces 5 and 5' with one another.

Said outer band 7 forms, at the area wherefrom the structure 1 extends, a distribution channel 14 having thereof at one end thereof a ventilating air supply duct 15 may be connected. That connection will be simply obtained by inserting the channel 14 on the upright wertical walls of the duct 15, and possibly by stabilizing the assembly by means of welding.

Provided within said distribution channel is a header 16 for collecting heated air flowing out of the longitudinal hole 9.

In practice, the ventilating air, which has a low temperature, in flowing through the outer interspace 5', keeps the covering 7 at a sufficiently low temperature.

That same air flows into the inner interspaces 5 from above and past the upper portion of a generic extruder cylinder (not shown) to exert a cooling action thereon and undergo a fast heating process.

Thereafter, the thus heated ventilating air flows through the lower portions of the interspaces 5 to produce, in essence, a condition of uniform temperature over the whole portion of the extruder cylinder.

Said heated air is then recovered through the header 16 and may be advantageously utilized for other applications.

Such other applications may include, for example, preheating of plastic materials, furnace heating, dehumidification of moist or wet material hoppers, heating flat blowing heads, dies, inside taps, etc.

In particular, as it is shown in FIG. 5, the air supply duct 15 comprises a duct body 15', made for example of a solid metal or plastics material, through which open channels 15" or through holes are formed for the inflow of the ventilating air entering at the bottom of the duct 15. Inside the air supply duct there is located the hot air recovering header 16, of U-shaped cross-section, extending along all the length of the thermal unit.

From the foregoing description and an observation of the accompanying drawing, the improved functionality and practicality of the electric thermal unit for controllably heating cylinders in extruders, presses, and drawing machines, according to this invention, may be fully appreciated.

Of course, the inventive electric thermal unit has been described and illustrated herein by way of example and not of limitation for the sole purpose of showing its practicability and general features, and the same may be altered and modified as may occur to a skilled person in the art, without departing from the true scope of the innovative idea set forth hereinabove.

I claim:

1. An electric thermal unit for controllably heating cylinders in extruders, injection presses and drawing machines, comprising a coiled resistance heater incorporated to a structure bent on itself into a ring-like shape and including a plurality of ceramic strips which are coupled together and define, at the middle longitudinal portion thereof, holes for passing as many runs of said coiled resistance heater therethrough, characterized in that, at the peripheral longitudinal portions thereof, said strips are formed with holes forming two substantially continuous outer and inner interspaces, intercommunicating at two end portions whereof, said structure comprising a double outer band, said outer interspace being in communication with a heater adapted to deliver air, as heated by said resistance heater, to provide utilization outlets.

2. An electric thermal unit according to claim 1, characterized in that said shaped strips have a substantially rectangular cross-section parallelepipedal configuration and are mutually attached by mating together major faces thereof, said major faces following a respectively concave and convex pattern at the longitudinal middle portion thereof.

3. An electric thermal unit according to claim 1, characterized in that said double outer band incloses a layer of a suitable insulating material, and that the ends thereof are joined together by suitable fasteners.

4. An electric thermal unit according to the preceding claim 1, characterized in that said ring-like structure extends from two juxtaposed strips bounding a longitudinal hole and is terminated, on both sides, by a differentiated strip having a middle groove, a strip cooperating with said differentiated strip to form an interspace between the longitudinal edges of said differentiated strip.

5. An electric thermal unit according to claim 1, characterized in that said double outer band forms, at the area wherefrom said ring-like structure extends, a distribution channel, to one end whereof is connected a ventilating air duct and within said distribution channel there being provided a header for collecting the heated exhaust air.

* * * * *